United States Patent [19]

McDonough

[11] Patent Number: 5,054,007
[45] Date of Patent: Oct. 1, 1991

[54] HANDCLAP ACTIVATED CAT REPELLING DEVICE

[76] Inventor: Rod McDonough, 1625 Hopper Ave., Santa Rosa, Calif. 95403

[21] Appl. No.: 627,754

[22] Filed: Dec. 14, 1990

[51] Int. Cl.⁵ .............................................. H04B 1/02
[52] U.S. Cl. ......................................... 367/139; 367/2
[58] Field of Search .......................... 367/139, 2, 198; 340/384 E, 384 R

[56] References Cited

U.S. PATENT DOCUMENTS

| | | | |
|---|---|---|---|
| 3,753,421 | 8/1973 | Peck | 119/29 |
| 3,823,691 | 7/1974 | Morgan | 367/2 |
| 4,188,622 | 2/1980 | Miller | 340/571 |
| 4,366,562 | 12/1982 | McGinty | 367/139 |
| 4,507,653 | 3/1985 | Bayer | 367/198 |
| 4,658,386 | 4/1987 | Morris | 367/139 |
| 4,689,776 | 8/1987 | Thorndyke | 367/139 |
| 4,733,633 | 3/1988 | Yarnall | 119/29 |
| 4,876,674 | 10/1989 | Parmely | 367/139 |

*Primary Examiner*—Daniel T. Pihulic
*Attorney, Agent, or Firm*—Larry D. Johnson

[57] ABSTRACT

A compact, sound activated device for repelling house cats from indoor surfaces and areas. When triggered from a remote location by a sharp audio signal such as that of a human handclap, the device produces a deterrent sound which repels cats from the area or surface upon which the device is placed. The deterrent sound is audible within the normal range of human hearing and terminates automatically after several seconds. The device, comprising a single housing, is battery powered and has external controls for regulating handclap sensitivity, deterrent sound volume level, and current flow from the battery.

3 Claims, 2 Drawing Sheets

HANDCLAP ACTIVATED CAT REPELLING DEVICE

BACKGROUND OF THE INVENTION

Field of the Invention

The present invention relates to sound activated electronic devices which influence animals, specifically to such a device which repels house cats from indoor surfaces and areas.

Cat owners, particularly owners of indoor cats, are presented with difficulties in their attempts at keeping cats off of various surfaces and away from various areas in the home. Examples of surfaces on which cats might be unwanted may include furniture, tables and countertops on which food is prepared or served, shelves on which breakable items are kept, and electronic equipment. Examples of areas around which cats might be unwanted may include children's play areas, food storage areas, areas behind electronic equipment where cords and wires are exposed, areas around houseplants, and entrances to certain rooms.

SUMMARY OF THE INVENTION

Briefly stated, the present invention is a compact, sound activated device for use on indoor surfaces and areas that, when triggered from a remote location by a sharp audio signal such as that of a human handclap, produces a deterrent sound which repels cats from the area or surface upon which the device is placed. The deterrent sound terminates automatically after several seconds. The device then resets itself and is ready for subsequent use.

The above summary is to provide familiarity with the present invention as it relates to the descriptive and comparative discussion of prior art which follows.

PRIOR ART

Heretofore, products available to cat owners for the purpose of repelling cats have been, for the most part, chemical in nature. While chemical repellents are useful, such products have limitations. As chemical repellents rely on odor as a primary method for repelling cats, odors that tend to repel cats often smell unpleasant to humans. Whether or not such repellent odors are unpleasant to the human sense of smell, repeated use of chemical repellent results in an eventual build-up of repellent odor on carpeting and furniture. In any case, chemical pet repellents are unsuitable for use on surfaces where food is prepared or served.

The use of toy squirt guns as a manner for repelling cats is somewhat effective and relatively harmless, however squirt guns are rarely in sight or readily at hand for the particular moments when they are needed. A common scenario often follows: when a squirt gun is finally located, a cat may already have had ample opportunity to complete a disobedient act and may even have moved elsewhere. At that point, after the disobedient act has occurred, a squirt of water to a cat would be meaningless as a deterrent for improper behavior. If a cat owner is fortunate to have a squirt gun handy at the very moment a disobedient act occurs, the stream of water cannot be directed at electronic equipment, electric wall sockets, or objects which might become damaged by water.

In the field of sound activated electronic devices which influence animals, U.S. Pat No. 3,823,691 to Morgan (1974) describes a device which discourages dogs from barking. This device reacts to the sound of barking by emitting a high frequency signal, inaudible to humans, that stops when barking ceases. As the high frequency signal produced by the Morgan device is irritating to dogs, continued barking is therefore discouraged.

Although the Morgan device and that of the present invention are activated by audio signals, factors which distinguish the two include the following:

a) In the device of the present invention, a method for repelling house cats from indoor surfaces and areas is presented. In the Morgan device, a method for discouraging dogs from barking is presented.

b) Activation of the device of the present invention is triggered by detection of a sharp audio signal, such as that which is produced by a single human handclap. Activation of the Morgan device is triggered by detection of an audio signal such as that which is limited to an area within the relative frequency range of dog barking, and furthermore is intended to activate only after the audio signal has satisfied certain time requirements. An audio signal of short duration, such as that which is produced by a single human handclap, will not activate the Morgan device.

c) The deterrent sound emitted by the device of the present invention is audible to humans and terminates automatically after several seconds. The deterrent sound emitted by the Morgan device is audible to dogs, inaudible to humans, and terminates only after barking has ceased.

Although the device as described in U.S. Pat. No. 3,823,691 to Morgan (1974) appears useful as a device which discourages dogs from barking, a manner for repelling cats is not addressed.

In unrelated fields, sound activated electronic devices which react to handclap signals are known to exist for purposes other than that of influencing animals. One such device, attached to a key ring, is useful for locating lost keys. This miniature device, powered by button-cell type batteries, emits a relatively faint beeping sound similar to that of an electronic wristwatch alarm. The handclap signal it receives must be programed in advance as a series of steady handclaps occurring at regular intervals. Activation of the device occurs only when the same pattern of handclaps as programed, without variation, is detected.

To reiterate, the handclap activated key ring device described above is not intended as a method and apparatus for influencing animals, and furthermore lacks the characteristics and capabilities required for the specific purpose of repelling cats, which will become apparent as the present invention is examined in greater detail.

In conclusion, a need remains in the prior art for an indoor cat repelling device, particularly for such a device which can be used with relative safety on or near surfaces and areas in which cats are unwanted, and which can be activated instantly from a remote location without the need for additional apparatus.

OBJECT OF THE INVENTION

The problem remaining in the prior art is addressed in the present invention, whose objects and advantages are:

a) to provide a cat repelling device which is compact and can be placed with relative safety on or near surfaces and areas in which cats are unwanted;

b) to provide a cat repelling device which is not fixed and can be moved easily from one location to another;

c) to provide a cat repelling device which can be activated instantly from a remote location by a cat owner without the need for additional apparatus;

d) to provide a cat repelling device which reacts to a cat's disobedient behavior at, or within close proximity of the location where disobedient behavior occurs;

e) to provide a cat repelling device which reacts to a cat's disobedient behavior at the moment of, or prior to disobedient behavior;

f) to provide a cat repelling device which will not harm humans or animals;

g) to provide a cat repelling device which is non-chemical in nature;

h) to provide a cat repelling device which is inexpensive to produce.

Further aspects of the present invention will become apparent in the drawings and detailed discussions which follow.

DESCRIPTION OF REFERENCE NUMERALS IN FIG. 1 AND FIG. 2

Figure 1:
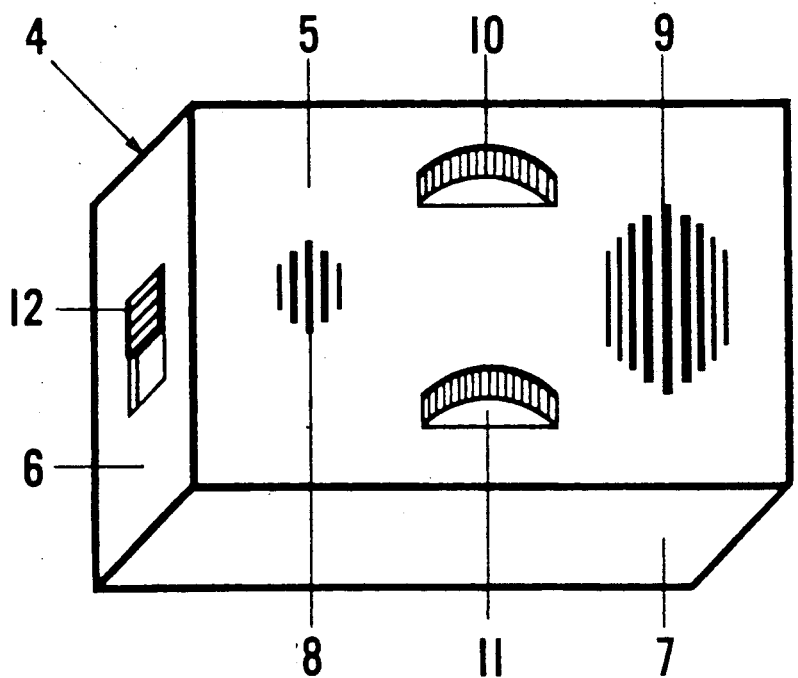
FIG. 1 illustrates a perspective top, front, and first side view of a preferred embodiment of the present invention.

4 housing
5 top wall
6 front wall
7 first side wall
8 small audio opening
9 large audio opening
10 external control for sensitivity
11 external control for volume
12 external control for switch
13 bottom wall
14 rear wall
15 second side wall

DESCRIPTION OF REFERENCE NUMERALS IN FIG. 3

16 switch, SPST 125 VAC 1 amp (on/off)
17 microphone, omni-directional electret condenser
18 capacitor, 0.47 uf 25 v polarized or non-polarized (typically tantalum)
19 integrated circuit, LM741 general purpose operational amplifier
20 potentiometer, 100 k ohm ¼ w 10 turn
21 resistor, 4.7 k ohm ¼ w 5% carbon film
22 resistor, 4.7 k ohm ¼ w 5% carbon film
23 capacitor, 0.47 uf 25 v polarized or non-polarized (typically tantalum)
24 transistor, general purpose PNP 2n2222
25 resistor, 1 k ohm ¼ w 5% carbon film
26 integrated circuit, LM555 (timer)
27 resistor, 1 k ohm ¼ w 5% carbon film
28 capacitor, 10 uf 16 v +10% tantalum or electrolytic
29 capacitor, 0.01 uf 16 v +20% ceramic
30 alarm, piezo transducer 3-28 v 20 ma
31 potentiometer, 100 k ohm ¼ w 5%
32 battery, 9 VDC Duracell type MN1604

DETAILED DESCRIPTION OF THE DRAWINGS

Figure 3:
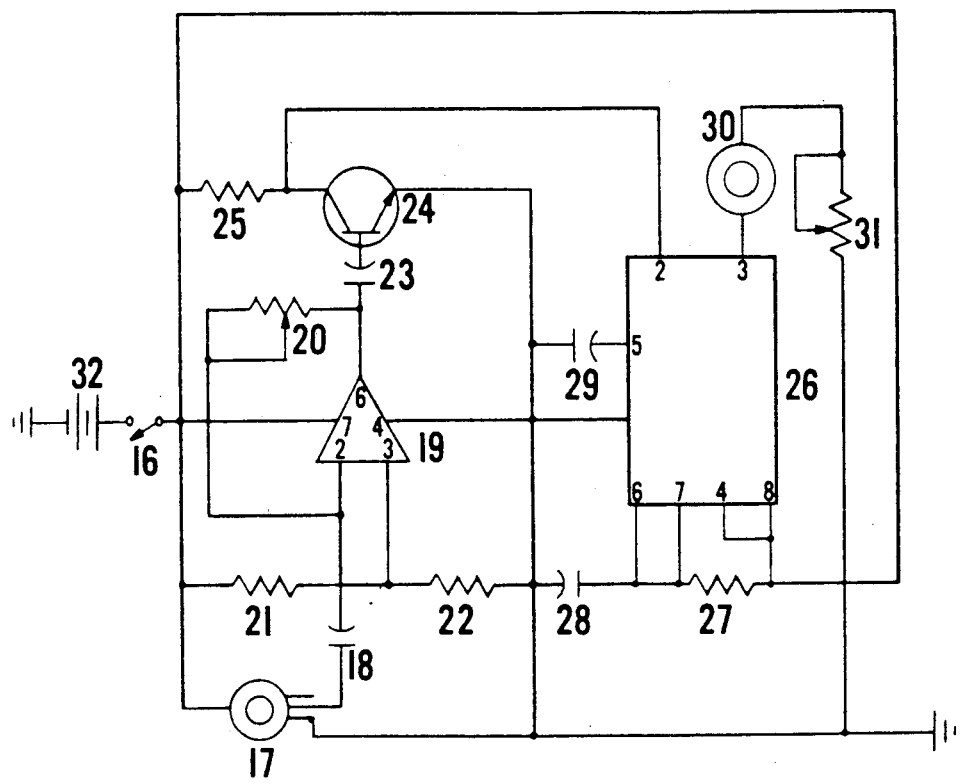
FIG. 3 illustrates a schematic circuit diagram of a preferred embodiment of the present invention.

Referring to FIG. 1, a housing 4 as seen from a perspective view showing its top wall 5, front wall 6, and first side wall 7, is sufficiently compact to facilitate convenient placement of the device. Mounted on the top wall 5 is a small audio opening 8 which allows an audio detector microphone 17 (FIG. 3) to detect a remote audio signal such as that produced by a human handclap. When a handclap signal is detected, components detailed in FIG. 3 trigger a piezo alarm 30 (FIG. 3) which emits a deterrent sound through a large audio opening 9 located on the top wall 5. The deterrent alarm sound is audible within the normal range of human hearing. Also on the top wall 5 are two external controls 10 and 11. External control 10 enables a user to regulate the device's sensitivity to a remote handclap signal. External control 11 enables a user to regulate the volume level of the deterrent alarm sound. The deterrent alarm sound terminates automatically within a predetermined period of two to four seconds by way of an integrated circuit 26 (FIG. 3). A period of two to four seconds of duration for the deterrent alarm sound is sufficient to startle or discomfort a cat, yet brief so that inconvenience to humans is minimal. Mounted on the front wall 6 is an external control 12 for on/off switch 1 (FIG. 3) which enables a user to activate and de-activate current flow from battery 32 (FIG. 3).

Figure 2:
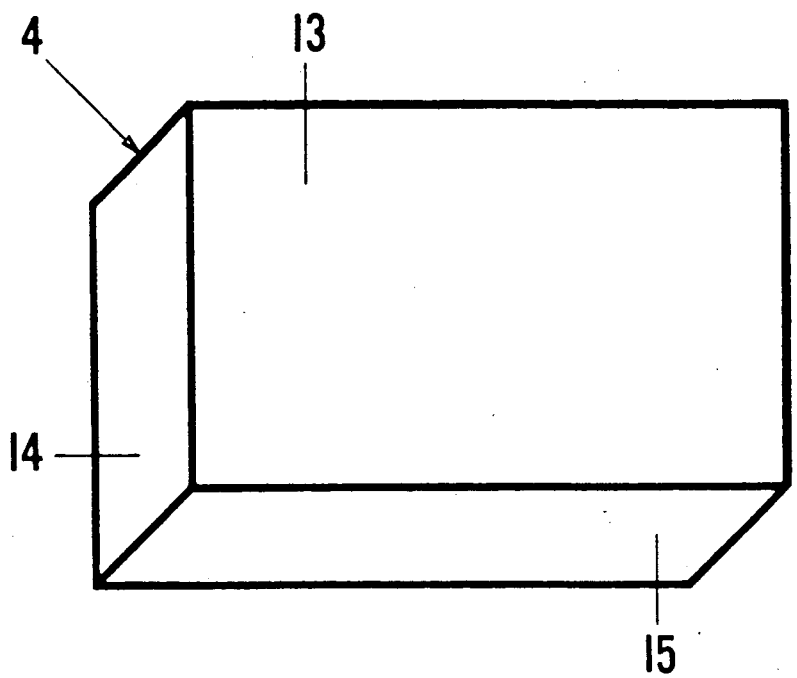
FIG. 2 illustrates a perspective bottom, rear, and second side view of a preferred embodiment of the present invention.

Referring to FIG. 2, the bottom wall 13, rear wall 14, and second side wall 15 of housing 4 have no protruding external features. The above walls and first side wall 7 (FIG. 1) which has no protruding external features, are to facilitate convenient placement of the device.

Referring to FIG. 3, a schematic circuit diagram is illustrated. Input power to the circuit illustrated in the schematic diagram of FIG. 3 may be derived from either a 9 VDC battery 32 or a line powered 9 VDC power supply capable of providing 7-10 VDC at 30-50 ma. Typically, however, the power is derived from a standard 9 VDC battery, such as a Duracell alkaline battery type number MN1604, to allow for portability and convenient placement of the device. When switch 16 is closed, voltage is supplied to the circuit. Broadband audio is detected via an omni-directional electret condenser microphone 17 in a range of typically 50 HZ to 8 KHZ at levels typically from −80 db to +80 db. The audio signal is coupled from the transducer through electrolytic capacitor 18 to the input of integrated circuit 19, a general purpose operational amplifier such as National Semiconductor type LM741. The op amp is configured as an inverting amplifier. Peak voltage detection and gain of the circuit is determined by adjusting feedback potentiometer 20. Resistors 21 and 22 form a voltage divider network which provides a voltage equal to one half the supply voltage as a comparator reference voltage to the non-inverting input to integrated circuit 19. Resistor 22 may be substituted with a potentiometer to control input sensitivity. When signals appearing at input pin two of integrated circuit 19, of negative polarity in excess of typically 4.5 VP, integrated circuit 19 provides an output signal of positive polarity which is coupled through capacitor 23 to the base of general purpose switching transistor 24. Transistor 24 will begin conducting as a result of the base excitation, and the voltage to the collector will effectively drop to zero. Collector load resistor 25 is of a selected value (typically 1K ohm) to limit excess current flow through transistor 24 when switching occurs. The collector high-to-low voltage action is used as a trigger source for integrated circuit 26, a timer. Integrated circuit 26 is typically an LM555 timer as manufactured by National Semiconductor. For economy, the 555 timer in this circuit is wired in one of its most basic monostable modes. It consists of only two timing components; resistor 27 and electrolytic capacitor 28, integrated circuit 26, and bypass capacitor 29. Capacitor 29 is not absolutely essential for operation, however is used to provide improved noise immunity. When the trigger input terminal is held higher than one third of the timer source voltage due to transistor 24 not conducting, the timer is in its standby state and the output is low. When a trigger pulse appears with a level less than one third source voltage due to transistor 24 conducting, the timer is triggered and starts its timing cycle. The output rises to a high level near V+ at the same time capacitor 28 begins to charge toward V+. When the capacitor 28 voltage reaches two thirds V+, the timing period ends with the output falling once again to zero, ready to respond to another input trigger state. Due to the internal latching mechanism of integrated circuit 26, the timer will always time out once triggered, regardless of any subsequent noise or signal on the input trigger. The output pulse width is typically two to four seconds in duration. The duration is determined by the values of timing capacitor 28 and resistor 27, and may be adjusted to provide a range of milliseconds to hours in duration if desired. The output of timer 26 is connected to piezo alarm 30 which provides an audible alarm sound, such as a buzzer, typically 50-100 db for a period equal to the duration of the output pulse from integrated circuit 26. Potentiometer 31 is connected in series with piezo alarm 30 and is used to limit current and voltage to control output sound level.

DESCRIPTION OF OPERATION

In use, the device of the present invention is placed on a surface, an object, or near an area where cats are not allowed. External control for switch 12 (FIG. 1) is placed in the closed, or on position. External control 10 (FIG. 1), which regulates the device's sensitivity to a desired handclap signal, is adjusted by the user to a desired level of sensitivity. The device will respond to a sharp handclap signal from a distance of up to twenty five feet (approx.), adequately covering the length of most household rooms and adjacent areas.

For example, if the device is to be placed at one end of a large room, greater sensitivity would be required for a handclap signal if the user expects to occupy an area at the opposite end of the room, such as an area behind a kitchen counter or at a desk. A similar level of sensitivity would be required if the device were to be placed in one room when the user is occupying an adjacent room. Conversely, less sensitivity would be required if the device were to be placed in a small room when the user is nearby.

As cats react to various sound levels differently, external control 11 (FIG. 1) allows the user to adjust the volume of the deterrent alarm sound to a desired level which can be tested by activating the device with a handclap signal.

When a cat is seen, heard, or suspected of being in or approaching a restricted area, surface or object, the user produces one sharp handclap signal to activate the device of the present invention. Once activated, the device emits a deterrent sound that lasts typically for a period of two to four seconds. The cat, being startled by the deterrent sound, backs away or leaves the area entirely. When the deterrent sound terminates, the device resets itself and is ready for re-use as long as battery life permits. When not in use, external control for switch 12 (FIG. 1) is placed in the open, or off position to conserve battery life.

SUMMARY AND RAMIFICATIONS

In the present invention as described above, a method and apparatus for the specific purpose of repelling house cats is presented, addressing the need for such a method and apparatus which remains in the prior art. Although but one embodiment of the present invention is described, it will become apparent to those skilled in the art that various modifications, alternate equivalents and constructions may be employed without departing from the true spirit and scope of the invention. For example, while the present invention is described as having an alarm component fixed inside the housing, alternative alarm components such as interchangeable alarm component modules with internal or external accessibility can be employed, thereby affording greater utility to cat owners who can select from a variety of cat deterring sounds.

The above descriptions and illustrations should not be construed as limiting the scope of the invention which is defined by the appended claims.

What is claimed is:

1. A handclap activated cat repelling device comprising:
   a housing having external dimensions sufficiently compact to facilitate convenient placement on indoor surfaces;
   means within said housing for detecting an audio signal as produced by said handclap, said housing including an externally accessible adjustment means for regulating sensitivity of said detecting means to said audio signal;
   means for transforming said audio signal into an electrical impulse;
   means for converting said electrical impulse into an audible alarm sound which is detectable by and repulsive to cats;
   externally accessible adjustment means for regulating the output volume of said audible alarm sound;
   means for limiting the duration of said audible alarm sound; and
   a power source for providing electrical current to said device.

2. The device of claim 1 wherein said power source is a battery contained within said housing.

3. The device of claim 1 wherein said housing includes an externally accessible switch control for enabling selective activation and de-activation of said electrical current to said device.

* * * * *